United States Patent [19]

Herbst et al.

[11] 4,001,884
[45] Jan. 4, 1977

[54] APPARATUS AND METHOD FOR RECORDING AND REPRODUCING DIGITAL-DATA

[75] Inventors: Wayne R. Herbst, Northbrook; Paul L. Mika, Des Plaines, both of Ill.

[73] Assignee: Teletype Corporation, Skokie, Ill.

[22] Filed: July 10, 1975

[21] Appl. No.: 594,835

Related U.S. Application Data

[62] Division of Ser. No. 525,435, Nov. 20, 1974.

[52] U.S. Cl. .................................. 360/40; 360/51
[51] Int. Cl.$^2$ ........................................ G11B 5/00
[58] Field of Search .................. 360/40, 41, 42, 43

[56] References Cited

UNITED STATES PATENTS

| | | | |
|---|---|---|---|
| 3,727,202 | 4/1973 | Fort | 360/40 |
| 3,731,220 | 5/1973 | Besenfelder | 360/40 |
| 3,818,501 | 6/1974 | Fiorino | 360/40 |

*Primary Examiner*—Vincent P. Canney
*Attorney, Agent, or Firm*—W. K. Serp; M. Pfeffer

[57] ABSTRACT

A series of digital words are demultiplexed into two groups and recorded on parallel tracks of a magnetic tape. The digital information is phase encoded upon the two tape channels and during playback the magnetic flux reversals on each channel are separately detected. The peak level of the detected signal is sensed and a peak signal pulse generated corresponding to the occurrence of the peak of the detected signal. Means are additionally included for setting the minimum threshold of the incoming signal necessary to generate a signal pulse so as to provide a level of immunity to system noise. The peak signal pulses are decoded to reconstruct the original data signal and a clocking signal. The data from each of the channel decoders is clocked into respective channel shift registers and multiplexed into its original data word arrangement.

4 Claims, 5 Drawing Figures

FIG. 2

APPARATUS AND METHOD FOR RECORDING AND REPRODUCING DIGITAL-DATA

RELATED APPLICATIONS

This application is a division of U.S. application No. 525,435, filed Nov. 20, 1974, by W. R. Herbst et al. entitled "Apparatus and Method for Recording and Reproducing Digital-Data."

BACKGROUND OF THE INVENTION

This invention generally relates to a method and apparatus for recording and reproducing digital data and more particularly relates to the recording and reproducing of digital data onto and from a magnetic tape.

Various arrangements have been suggested and described for the temporary storage of digital information. A particular storage media enjoying increased interest is a magnetic tape. Such tapes are conveniently stored in small enclosed cassettes. An apparatus particularly adapted for recording and playback of digital signals from such magnetic tape cassettes is described in a copending application of K. Rothlisberger and R. Vee, Ser. No. 479,395, filed June 14, 1974, entitled "Apparatus and Method for Positioning A Tape Cassette," having a common assignee herewith. One problem frequently encountered with the use of magnetic tape cassettes is that noise levels during playback tend to be high, often causing the generation of erroneous data signals. The maximum recording speed at which such magnetic tape cassettes can be utilized has been limited by the mechanical problems encountered in handling the tape at high speeds. Further, aside from the mechanical problems encountered with high recording speeds, pulse crowding upon the tape at higher bit densities results in lower signal levels during playback making the playback system more susceptible to noise problems.

Different detection systems have been utilized during playback for sensing the flux reversals on the tape as created by the recording signal. These systems have generally been rather complicated and have often utilized a circuit tuned to a particular digital data frequency and bit density. However, when the recording signal changes or the tape speed materially varies, as is the case with direct reel rather than capstan drive of the tape, the detector tuned circuit requires readjustment for optimum performance. The following described embodiment includes means for effectively increasing the data density carried by a magnetic tape without an increase in the mechanical speed at which the tape is transported nor with a resulting increase in the bit density of the recorded signal. Additionally, the described embodiment includes improved means for detecting the data signal recorded upon a magnetic tape which is relatively free from the adverse effects of system noise.

SUMMARY OF THE INVENTION

Described is an apparatus for recording a digital signal composed of a series of digital words upon an elongated magnetic tape defining at least two continuous parallel oriented informational channels. The informational signal is split into at least two word groups; each group related to one of the informational channels. Means are provided for concurrently recording each group of words upon one of the channels. At least two playback detectors are included; each detector being associated with one of the tape channels and serving to provide a signal corresponding to the digital information recorded upon the associated channel. Additionally, the output from each of the detectors is fed to a channel decoder which serves to convert the detected signal into digital form. The illustrated apparatus includes means for combining the digital signals from the detectors in their original incoming sequence so as to produce an outgoing signal having a digital word arrangement corresponding to the word arrangement of the incoming signal.

Means are included for detecting the signals played back from the magnetic tape whereon the digital data is recorded in the form of magnetic flux reversals. The flux reversals, during playback, produce a varying signal having a peak amplitude. This varying signal is fed to the first input of an amplifier. The amplifier includes a second input providing an amplified output inverted with respect to the amplified output created by the first input. Additionally, means are included responsive to a predetermined level of the output signal for coupling the output signal to the second input with storage means coupled to the second input. The output signal follows the varying input signal until the coupling means conducts. Upon conduction, the output voltage remains constant. In response to a slope reversal of the input signal, both amplifier inputs become additive producing an abrupt reversal in the polarity of the output voltage from the amplifier.

A decoder and means for coupling the amplifier to the decoder are actuated as well as means for interrupting the output of the amplifier to the decoder below a fixed level thereby establishing a minimum threshold below which the peak amplitude output of the amplifier is prevented from being coupled to the decoder. The decoder includes means for generating a data signal and a timing signal from the output of the amplifier and for utilizing the data and timing signals to reconstruct a digital signal corresponding to the digital signal recorded upon the magnetic tape.

It is a main object of this invention to provide an improved means for recording digital data upon a magnetic tape and for detecting the recorded digital signal. Other objects and advantages of the invention will become obvious from the following description of a preferred embodiment when considered in conjunction with the accompanying drawings.

DESCRIPTION OF THE DRAWINGS

FIG. 3 which includes FIG. 3A and 3B, is a relative timing diagram illustrating the relationship of various selected signals of the apparatus illustrated in FIGS. 1 and 2.

DESCRIPTION OF THE ILLUSTRATED EMBODIMENT

-RECORD-

Figure 1:
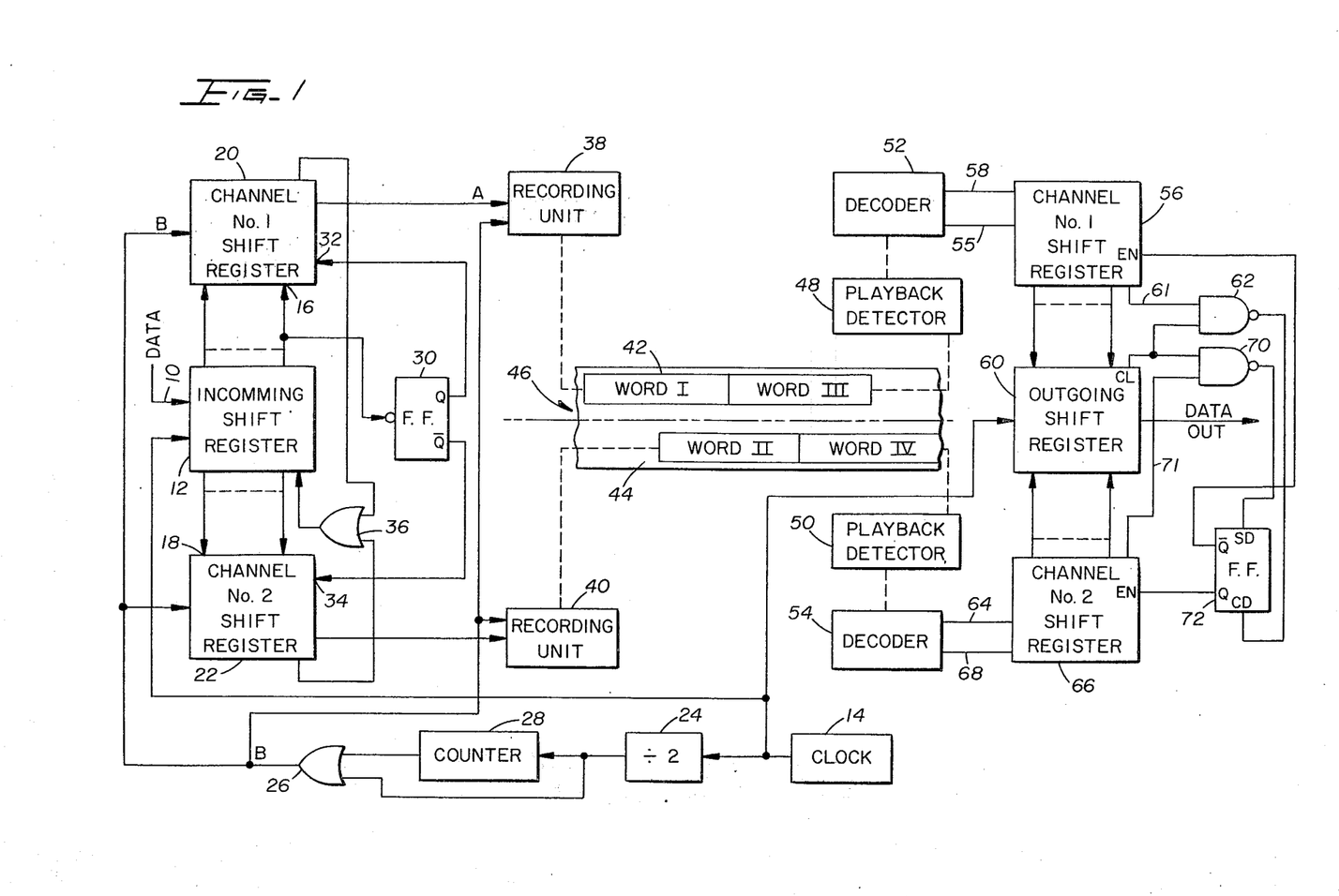
FIG. 1 is a schematic block diagram of a magnetic tape playback and record apparatus including certain features of this invention.

With particular reference to FIG. 1, incoming data is fed via an incoming data line 10 to the series input of a high speed thirteen bit incoming shift register 12. Each data word is composed of a start bit followed by twelve informational bits and a buffer zone the length of which is equivalent to four data bits (A of FIG. 3A). The start bit and informational bits of the incoming signal are stepped into the register 12 in response to the output of a free-running clock 14. The thirteen bit parallel output of the incoming shift register 12 is fed to the parallel inputs 16 and 18 respectively of parallel to series, channel one 20 and channel two 22, thirteen bit shift registers. Serving to step the channel one 20 and channel two 22 shift registers is the output of a divide by two frequency divider 24 driven by the output of the clock 14. The output of the divider 24 is fed through one input of an OR-gate 26, the remaining input of which is fed by the output of a thirteen of seventeen counter 28 clocked by the output of the divider 24. The output B of the OR-gate is fed to the channel one 20 and channel two 22 shift registers which consequently are stepped at one-half the frequency of the incoming shift register 12 and interrupted for four out of seventeen counts, at A of the same figure.

Serving to alternately load the channel one 20 and channel two 22 shift registers with the output of the incoming shift register 12 is a shift register control flip-flop 30. The direct output of the flip-flp 30 is connected to a load input 32 of the channel one shift register 20 and the complement output of the flip-flop 30 is fed to a load input 34 of the channel two shift register 22 thereby alternately loading the channel shift registers 20 and 22 with the output of the incoming shift register 12. The flip-flop 30 is clocked by the last bit position, parallel output of the incoming shift registers. Thus, when the shift register 12 is filled with the thirteen incoming informational bits, a start bit will appear in the last position. This start bit is fed to the toggle input of the flip-flop 30, clocking the flip-flop 30 thereby enabling the unloaded channel shift register to receive the output from the incoming shift register 12. In this manner, each of the channel shift registers 20 and 22 are loaded with alternate words of the incoming data signal fed to the incoming shift register 12. Thus, the incoming data signal via line 10 is effectively divided into two word groups, each containing alternate data words of the incoming signal. The last bit position in each of the shift registers is fed through an OR-gate 36 to the clear input of the high speed shift register so that as each word is loaded into one of the channel registers 20 and 22, the location of the start bit in the last register bit position produces a clear signal which is fed to the incoming shift register allowing it to clear for receipt of the next data word. The serial output of each of the channel shift registers are fed to first 38 and second 40 channel recorders, each of which serves to record the information clocked from the channel registers onto one of two parallel oriented continuous channels 42 and 44 defined on a magnetic tape 46. The operation of the channel recorders 38 and 40 will be hereinafter further considered in connection with the discussion of FIG. 2.

As diagramatically illustrated in FIG. 1, the data word groups are recorded on the two parallel recording tracks 42 and 44 defined by the tape 46 in an alternating, overlapping pattern. For illustrative purposes, Word I is depicted as being written on the first channel 42 of the tape, with the second word II being written on the second channel 44 starting at the center portion of the first word and extending through the center of the word III which is written on the first channel. It will be appreciated that the tape is driven at ½ the speed which would be necessary were the incoming words recorded upon a single tape channel and the same overall recording speed desired. Thus, the recording capacity of the tape 46 is effectively increased by a factor of two without an increase in the transport speed of the tape or the bit density upon the tape 46.

-PLAYBACK-

Figure 2:
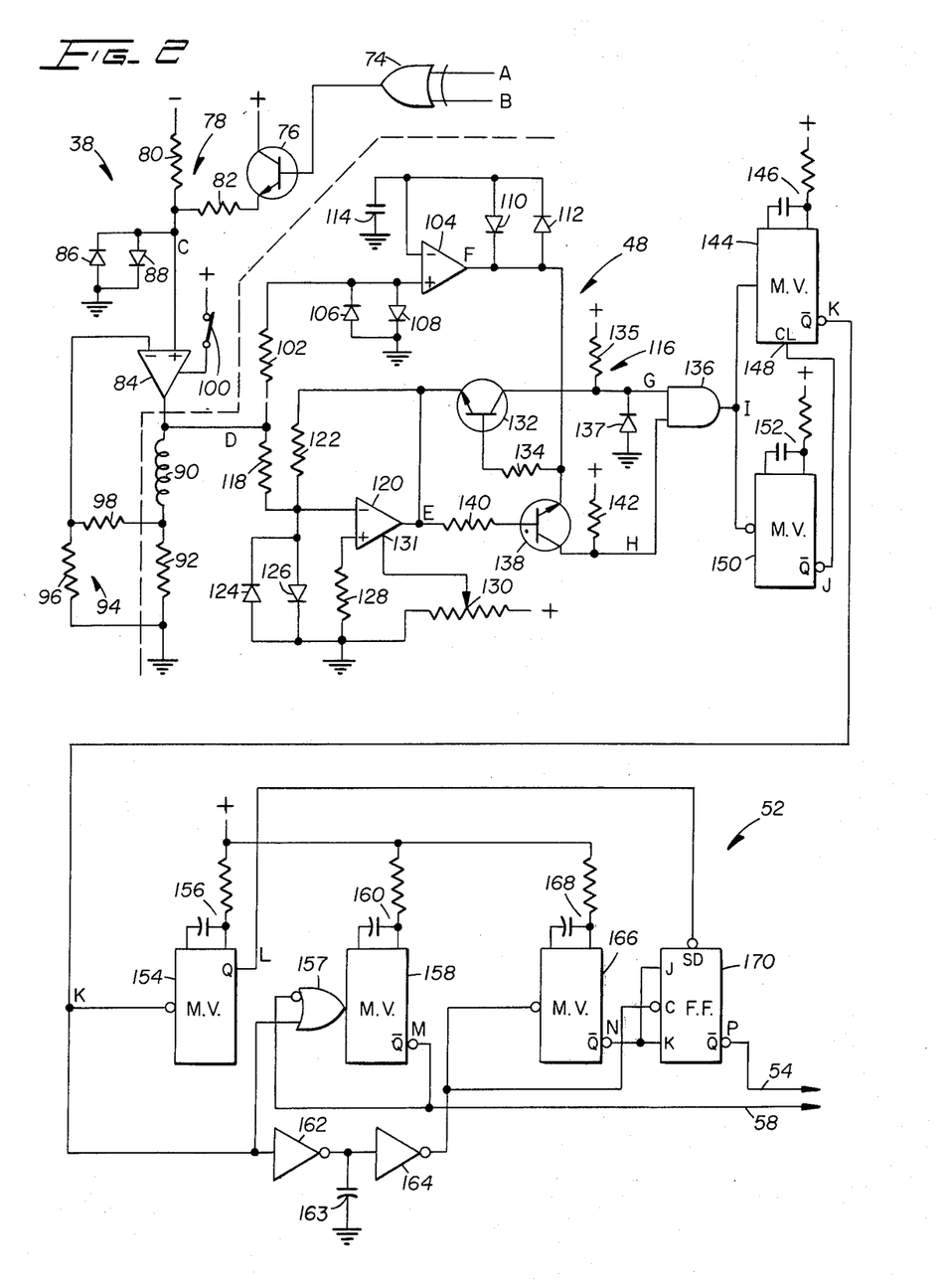
FIG. 2 is a schematic diagram of certain of the components forming a portion of the apparatus illustrated in FIG. 1.

During playback, each of the recorded signals is transduced from the tape by first 48 and second 50 channel playback detectors, the structural details of which will be hereinafter further described in connection with the discussion of FIG. 2. The first channel playback detector 48 feeds a first channel decoder 52 and similarly the second channel playback detector 50 feeds a second channel decoder 54. The data information from the first channel decoder 52 via line 55 is stepped into the serial input of a first channel output, serial to parallel, shift register 56 by a clock signal from the decoder 52 via line 58 and is selectively loaded into an outgoing high speed, parallel to serial, outgoing shift register 60.

When the channel one output register is filled with a data word, a data available signal is fed via line 61 to one input of a channel one NAND-gate 62. The remaining input of the NAND-gate 62 is fed by a register clear signal from the outgoing shift register 60. Similarly, data information from the second channel decoder 54 via line 64 is stepped into the serial input of a second output channel, serial to parallel shift register 66 by a clock signal from the decoder via line 68. The channel two shift register 66 provides a register full signal to one input of channel two NAND-gate 70 via line 71, the alternate input of which is similarly connected to the clear output of the outgoing shift register 60. The outputs of each of the NAND-gates 62 and 70 are respectively fed to reset and set inputs of an RS flip-flop 72. Serving to selectively enable readout from alternate shift registers 56 and 66, one output of the RS flip-flop is connected to control the readout of the outgoing channel one shift register 52 and the complement output of the flip-flop 72 is fed to the readout control of the outgoing channel two shift register 66.

In summary, the following conditions must exist before one of the output channel shift registers 56 and 66 is loaded into the outgoing shift register 60. The outgoing shift register 60 must be empty and data must be available at the parallel output of one of the channel shift registers 56 or 66. This condition exists when the start pulse is positioned in the last bit position of one of the channel shift registers. In response to these conditions, the flip-flop 72 initiates readout from the filled output shift register 56 or 66 and the data is transferred to the outgoing shift register 60. Since, as will be considered, the outgoing register 60 is clocked at approximately twice the speed of the incoming shift register, by the time the outgoing register 60 is cleared, the alternate output channel register will be full. This full condition toggles the flip-flop 72 and the full register will then be loaded into the outgoing register 60 as will be more fully appreciated after consideration of FIG. 2. In this manner, the data words, which are recorded upon both channels of the tape, are multiplexed into the same sequential arrangement in which they were located within the incoming data signal and at the same clock speed. Thus, the apparatus of FIG. 3 serves to record and reproduce an informational signal composed of a sequence of digital words by recording alternate words upon alternate, parallel oriented tape channels. In this manner the apparent effective recording speed is increased by a factor of two as compared with the recording of the informational signal on a single tract. This is accomplished without a corresponding increase in the tape transport speed or bit density upon the tape.

-RECORDING UNIT-

Figures 3, 3A:
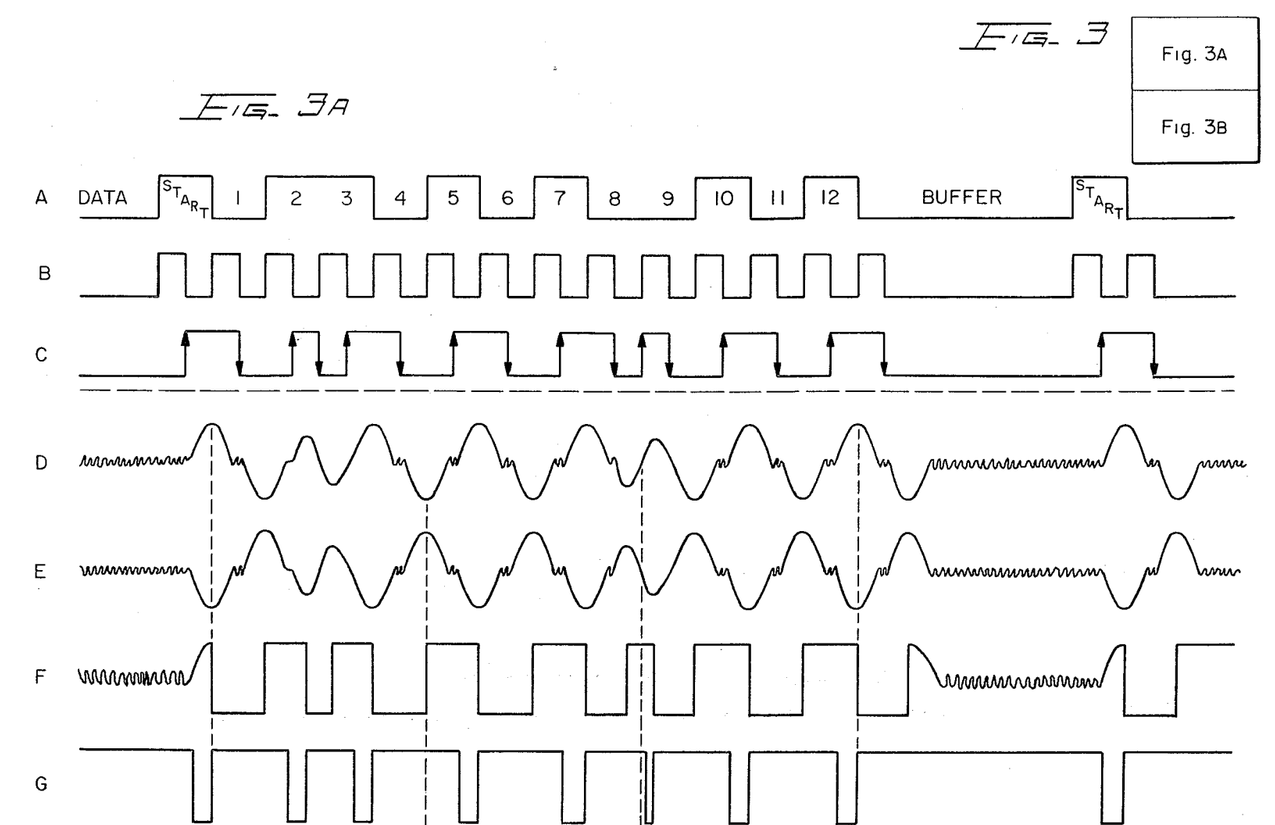

As previously described, the illustrated embodiment includes two identical recording units 38 and 40, each of which is associated with one of the tape channels 42, 44. As mentioned, the incoming data is word-interlaced on the two channels. With particular reference to FIG. 2, recording unit 38 is illustrated and includes a phase encoding exclusive OR-gate 74 which serves to phase encode the incoming data signal A. The data word A illustrated in FIG. 3A is fed into one input of the exclusive OR-gate 74 the remaining input receiving the clock signal B illustrated in FIG. 3A. When the two input signals A and B of the exclusive OR-gate 74 are of opposite polarity, the output of the OR-gate illustrated at C (FIG. 3A) goes high and when the inputs are the same, the output of the exclusive OR-gate goes low.

As previously mentioned, the clock signal B is interrupted for four out of seventeen clock pulses to produce a four bit buffer zone. It will be appreciated that since neither the clock input B or the data input A to the exclusive OR-gate 74 varies during this buffer period, the output of the exclusive OR-gate remains low during the four bit buffer zone. As will be subsequently described, the buffer zone is sensed and utilized to maintain word synchronization during playback of the data from the tape 44 so that tape speed variations will not create data loss. The phase encoded signal C from the OR-gate 74 is fed to the base of an NPN amplifying transistor 76. The collector of the amplifying transistor 76 is connected to the positive voltage source and the emitter is connected through a biasing resistive network 78 including series resistors 80 and 82 to the negative terminal of the supply. The output from the amplifier transistor 76 is taken from the junction of the two emitter biasing resistors 80 and 82 and fed to the direct input of a constant current amplifier 84. Additionally, at the direct input to the constant amplifier 84 are a pair of parallel connected diodes 86 and 88; the cathode of diode 86 being connected to the anode of a diode 88 and the diodes being connected between the direct input of the amplifier and the associated ground. The reversed parallel connected diodes 86 and 88 serve as a voltage clipper. In the event the input voltage to the amplifier 84 exceeds the junction voltage (0.6 volts) of the diodes, one of the diodes will conduct.

The output of the amplifier, which corresponds to the data signal A, is designated C and illustrated in FIG. 3A. Signal C is fed to one terminal of a coil 90 of a recording transducer, the remaining terminal of which is connected through a voltage sensing resistor 92 to ground. Current passing through the coil will develop a proportional voltage across the resistor 92. Serving to divide the voltage across the resistor is a resistive divider network 94 comprised of a series connected resistos, 96 and 98 the common junction of the resistors 96 and 98 being fed to the inverted input of the constant current amplifier. As will be subsequently described, the recording transducer coil 90 is used for both the record and playback operation and thus the amplifier 84 is disabled when the playback function is selected to prevent accidental erasure of the tape. Serving to disable the amplifier is a switch 100 connected between the power terminal of the amplifier and the positive supply source which, in the illustrated embodiment, is shown in the record mode. The current pulses through the coil 90 are recorded on the tape 44 as magnetic flux reversals in that a bit is a binary 1 or 0 which is represented on the magnetic tape by a plus or a minus direction of flux reversal. This type of recording is generally termed "phase modulation" and calls for a flux reversal in the minus direction for a 1 and in the plus direction for a 0 that is, every bit location on the tape 44 is indicated by a flux reversal and the data record upon the tape is termed self clocking with each flux reversal utilizing a finite portion of the tape. The direction of the flux density upon the tape 44 created by the recording signals C passing through the coil 90 is indicated by the arrows on signal C of the FIG. 3A. That is, the positive going arrow indicates a positive going flux change upon the tape; whereas the negative going arrow indicates negative flux reversal. A comparison of signal A with the flux reversals generated by signal C reveals that at least one positive going flux reversal is created for each binary 1 data bit and at least one negative going flux reversal is created for each binary 0 data bit.

-PLAYBACK DETECTOR-

During playback the magnetic flux variations from the tape 44 generate a varying output voltage D (FIG. 3A) across the pickup coil 90 of the transducer head. The low level variations in the signal D represent noise whereas the larger amplitude swings are created by the tape flux reversals. For example, during playback the positive going flux reversal will produce a half wave sinusoidal signal across the transducer head coil 90 and a negative going flux reversal produces a negative going half wave signal. It will also be noted that magnetic flux crowding, that is, the creation of rapid flux reversals upon the tape results in a reduction in the amplitude swings of the voltage level across the playback head. This reduction in amplitude occurs due to pulse crowding on the tape created by an increase in bit density during recording and generally renders the playback system more susceptible to noise. The output from the coil 90 is fed through a current limiting resistor 102 to the direct input of a peak detecting operational amplifier 104 which serves to detect the peak voltage swing of the varying voltage developed across the transducer coil 90. Limiting the voltage input to the amplifier 104 during the record operation are a pair of reverse connected, parallel diodes 106 and 108. In this manner, the peak input to the amplifier 104 is limited to the junction voltage of the diodes (0.6 volts). During playback the voltage developed across the coil 90 is sufficiently low that the diodes are effectively out of the circuit. However, during record these diodes protect the amplifier from the high recording voltages generated.

The operation of the peak detector amplifier 104 will be more particularly appreciated with reference to voltage F (FIG. 3A) developed across the output of the amplifier 104. During those portions of the tape 44 wherein the magnetic flux remains constant, noise generated by the tape and playback system is indicated by an amplified, random noise signal. In response to a flux reversal, the output of the amplifier 104 follows the rising half wave signal D and the amplified output rises in the same direction as the input signal. The output of the amplifier 104 is connected through a pair of parallel connected reverse diodes 110 and 112 to the inverting input of the amplifier 104 which is also coupled to ground through a capacitor 114. When the junction voltage (0.6 volts) of one of the diodes 110 or 112 is reached, that diode conducts charging the capacitor 114 and providing a signal at the inverting input of the peak detecting amplifier which is equal to the signal to the direct input. Since the voltage to the inverted input of the amplifier is equal to the direct input voltage the output of the amplifier limits at 0.6 volts plus the input voltage which is relatively small. When the slope of the first derivative of the signal to the direct amplifier 104 input reverses, i.e., leaves peak value, both the direct input and the inverting input to the amplifier become additive since the capacitor 114 prevents an abrupt signal reversal at the inverted input. With both signal inputs additive, the amplifier 104 swings abruptly in the opposite direction until the amplifier output reaches the conduction point of the previously non-conducting diode 110 or 112. When this previously non-conducting diode conducts, the output of the amplifier will limit at a value which is the sum of the input voltage plus the diode junction voltage (0.6 volts) and the capacitor charges with opposite polarity. Thus, the varying waveshape D, to the input of the peak detector amplifier 104, is converted to the square wave signal F having a polarity reversal corresponding to each signal peak, that is, the slope change of the input signal D. This relationship can be readily appreciated by comparing the signals F and D. For each positive signal D peak detected, the output of the amplifier 104 goes negative and for each negative peak detected, the amplifier output goes positive. The relative voltage levels previously described are provided by way of illustration and not in limitation of the embodiment herein described.

-NOISE THRESHOLD CIRCUIT-

Until the output voltage of the amplifier 104 reaches the threshold voltage of one of the diodes 110 or 112, the signal to the inverted input of the amplifier is low and the gain of the amplifier 104 is extremely high. This situation occurs when the input signal to the amplifier is constant, that is, in the absence of a flux reversal on the tape. Noise fed into the amplifier 104 input under such circumstances is greatly amplified and were it not for a noise threshold circuit 116, could produce false triggering of the decoder 52. The noise threshold circuit 116 prevents the decoder 52 from responding to noise when the amplifier 104 gain is extremely high by establishing the minimum input voltage threshold to which the peak detector amplifier 104 will respond.

Signal level D (FIG. 3A) from the recording head coil 90 is also fed through a limiting resistor 118 to the inverting input of a noise threshold amplifier 120. The output of the amplifier 120 illustrated at E (FIG. 3A) is fed through a feedback resistor 122 back to an inverted input of the amplifier 120, and serves to maintain constant gain through the amplifier 120. Connected across the inverting input of the amplifier 120 are a pair of parallel connected reverse diodes 124, 126 which serve to limit the input to the amplifier 120 below the junction voltage of the diodes 124 and 126 during the record mode of operation. In this manner the amplifier 120 is protected from excessively high input signals. The direct input of the amplifier 120 is connected to ground through a resistor 128 and this resistor in combination with an adjustable resistor 130 connected between the supply terminals and offset terminal 131 of the amplifier 120 serves, in combination with the feedback resistor 122, to permit adjustment of the amplifier 120 offset so that the output voltage swing will be about the zero voltage axis.

The output of the voltage amplifier 120 is connected to the emitter of an NPN negative noise pulse transistor 132, the base of which is coupled through a limiting resistor 134 to the output of the peak detection amplifier 104. The collector of transistor 132 is coupled through a load resistor 135 to the positive supply source and to one input of an AND-gate 136. Preventing negative excursions on the collector of the transistor 132 from damaging the AND-gate 136 is a diode 137 connected between the AND-gate 136 input and ground. A comparison of voltage level E (FIG. 3A) at the output of the amplifier 120 to a voltage level G (FIG. 3A) at the AND-gate 136 input and to level F, the operative features of the negative noise pulse transistor 132 will be more readily appreciated. A positive going signal at D causes E to go negative and F positive. When voltage E goes negative with respect to voltage F overcoming the base emitter junction voltage of the transistor 132 (0.6 volts), the transistor 132 will conduct producing a low signal at G. The gain of the amplifier 120 is selected so that this condition occurs only when the level F is sufficient to cause one of the diodes 110 or 112 to conduct. This transistor 132 in combination with the amplifier 120, determines the minimum negative threshold voltage which the input signal D must reach before an output signal G is produced.

Figure 3B:
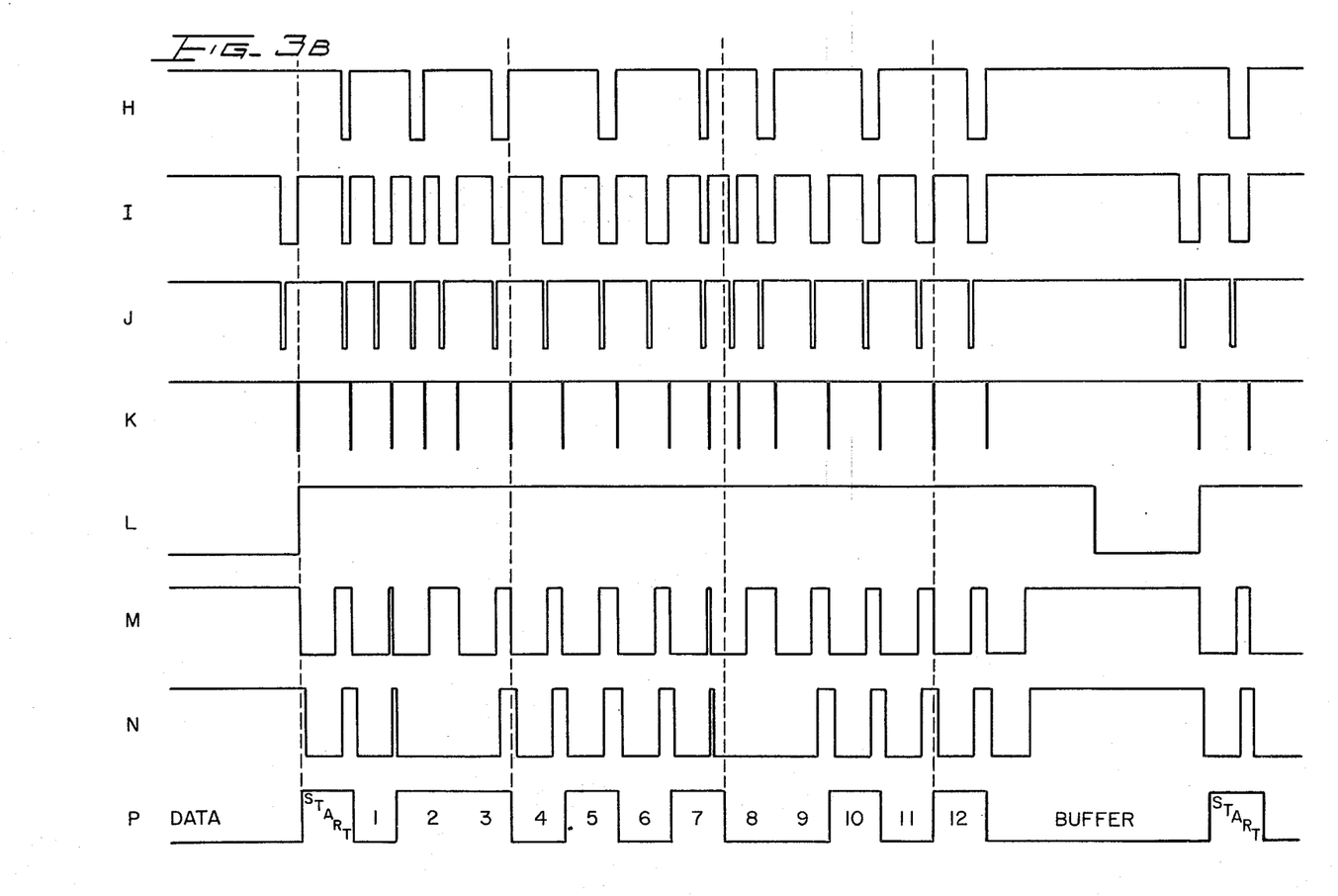

A positive going noise pulse PNP transistor 138 works in a similar manner. The base of the transistor 138 is connected to the output of the noise amplifier 120 through a current limiting resistor 140 and the collector of the transistor 138 through a load resistor 142 to the positive source of the supply. The collector is additionally coupled to the remaining input of the AND-gate 136 and the emitter of the transistor 138 is connected to the output of the peak detector amplifier 104 (voltage level F). It will be appreciated that when the voltage F drops below voltage E, by an amount greater than the breakdown voltage of the base emitter junction of the transistor (0.6 volts), the input to the AND-gate 136 indicated as level H (FIG. 3B) is low and when the voltage F rises above the voltage E, reverse biasing transistor 138 to cutoff, the output voltage I of the AND-gate 136 goes high and G is also high. Voltage level I is indicated in FIG. 3B. When voltage level H fed to the input of the AND-gate 136 goes low and the differential between the voltages E and F exceeds the base emitter junction of the transistor 138, the transistor 138 becomes forward biased thus going into saturation.

As previously mentioned, during noise periods, the gain of the peak detector amplifier 104 is relatively high in comparison to the gain of the noise amplifier 120. However, the differential voltage between the bases and respective emitters of transistors 132 and 138 is less than that necesary to drive either of the transistors 132 or 138 into conduction. In order for either of the transistors 132 or 138 to conduct the base to the emitter voltage must reach a value necessary to break down the transistor junction (0.6 volts). Since the noise level does not exceed the junction breakdown of the transistors, both transistors, in the presence of noise, are cut-off placing a high level signal at both of the AND-gate 136 inputs, maintaining the output voltage I of the AND-gate high. Only data signals, which rise to a level sufficient to develop a voltage differential greater than the base-emitter junction voltage of the respective transistors 132 or 138 will feed a signal to the inputs of the AND-gate 136.

The output of the AND-gate 136 voltage I, is fed to one input of a positive trigger multivibrator 144 which is provided with a relatively short time constant by means of an R-C network 146. The output of the multivibrator 144 voltage level K, illustrated in FIG. 3B, is fed to the decoder 52. The multivibrator includes an overriding clear input 148 which is fed by the complement output of a noise suppressing, negative trigger, multivibrator 150 having a time constant determined by an R-C network 152. The time constant of multivibrator 150 is slightly greater than the time constant of the multivibrator 144. The output of the AND-gate 136 is also coupled to the trigger input of the multivibrator 150. It will be appreciated that the previously described transistors 132 and 138, which serve to generate the input signals to the AND-gate 136 are switched in response to a sinusoidal voltage E from the voltage amplifier 120 and a square wave voltage F from the peak detector amplifier 104. The sinusoidal voltage E results in a relatively slow switching trigger voltage which may, in certain instances, cause erratic switching of the AND-gate 136 on the falling edge of the input signals to the AND-gate. To prevent false triggering of the multivibrator 144 by the slow falling (leading) edge of the input signals to the AND-gate 136, the multivibrator 150 provides an output pulse in response to the negative going edge of the AND-gate output and this output pulse is fed to the multivibrator 144 preventing switching during the negative going portion of the output signal from the AND-gate 136. This inhibit signal created by the multivibrator 150 terminates just prior to the positive going edge of the output I of the AND-gate 136 allowing the multivibrator 144 to generate a short timing pulse in response thereto. It will be apparent upon comparison of the voltage level D of FIG. 3A and the voltage level K of FIG. 2B that the output pulse from the multivibrator 150 occurs at a time which corresponds to the peak or slope change of level D. False triggering of multivibrator 144 on the falling edge of output signal I is prevented by output signal J from multivibrator 150. Thus, the decoder 52 receives only one pulse for each signal level D peak and erroneous signals generated in response to system noise and transistor switching characteristics are filtered out before reaching the detector 52.

-DECODER-

Signal level K from the multivibrator 144 is fed to the negative edge trigger input of a word synchronizing retriggerable multivibrator 154 of the decoder 52. The time constant of this multivibrator is determined by a resistor capacitor (R-C) network 156, the values of which are selected to provide a time constant approximately two informational bits in length illustrated as signal level L (FIG. 3B). Since the multivibrator 154 is retriggerable, it is triggered at the start of each data word and will time out during the buffer zone of the data signal A which, as previously mentioned, is four bits in length. When the multivibrator 154 times out, it goes low which signal level is used as an end of word synchronizing signal and seems to compensate for tape speed variations as will be subsequently further described. Additionally, signal level K from the multivibrator 144 is also fed through an OR-gate 157 to the input of a multivibrator 158 which generates timing pulses, signal level M FIG. 3B, fed to the respective channel shift register 56 (FIG. 1). The timing characteristics of multivibrator 158 are determined by an R-C network 160, the values of which are selected, to obtain a time duration approximately equal to three quarters of a code bit. The complement output of the multivibrator 158 (signal level M) is fed to the remaining input of the OR-gate 157, thus preventing retrigger of the multivibrator.

Additionally, the input signal K to the decoder is fed to the input of one of a pair of series connected inverters 162 and 164 which form a pulse stretching circuit. The output of the first inverter 162 is bypassed to ground through a small capacitor 163 which, in effect, elongates and delays the output pulse from the first inverter 162. The second inverter serves to reshape the elongated pulse. The output of the second inverter 164 is fed to a retriggerable decoding multivibrator 166 including an R-C network 168 providing a time constant which is approximately a three-quarter bit length. The output from the decoder multivibrator 166 signal level N (FIG. 3B) is fed to the J-K steering inputs of a decoder of flip-flop 170. A negative going clock pulse to the clock input of the flip-flop 170 with the J and K inputs low prior to the clock pulse, will result in the output of the flip-flop, after the clocking pulse, being equal to the output of the flip-flop 170 just prior to the clock pulse. If the J and K inputs are high prior to the clock pulse, the output will complement after the clock pulse, providing a data signal P illustrated in FIG. 3B.

-OPERATION-

In review, a sequence of data words is fed into the incoming shift register 12 with alternate data words being loaded into the channel one 20 and channel two 22 shift registers. The data words are alternately, selected and loaded into the respective channel shift registers under control of the flip-flop 30 and fed out from the respective channel shift registers at one-half the speed at which the incoming information is received. For example, the data words from the channel one shift register 20 are fed to one input of the encoding OR-gate 74. The data information is phase encoded and recorded upon the tape by the constant current driven record-playback head coil 90. Flux reversals are created upon the tape 46 on channel 42 which correspond to the bit arrangement of the recorded data word. As illustrated in FIG. 1, the data words are interlaced on both the channels of the tape thus providing an increased tape handling capacity than would be the case if each word were serially and sequentially located on a single channel of the tape 46. During playback, the flux reversals on the tape are sensed with alternate words being detected up by separate channel playback detectors 48 and 50. The flux reversals from the coil 90 adjacent channel 42 are fed to the peak detector 48 where a signal is generated in response to the peak level of the playback signal with a minimum noise threshold being set by the interaction of the amplifier 120 and transistors 132 and 138. The output from each of the transistors 132 and 138 is fed to respective AND-gate 136 inputs and to the multivibrator 144 which generates a single narrow pulse corresponding to each signal peak of the playback signal D. The pulse signals from the multivibrator 144 are fed to the decoder circuitry whereat they serve to generate a clocking signal M as well as a data signal P fed via lines 58 and 54 respectively, to the channel 1 shift register 56.

Alternate data words are taken from the channel output shift registers 56 and 66 and multiplexed by the high speed output shift register 60. Data is clocked by the signal from the clock 14 at an increased speed with the words recombined in their original incoming sequence. It will be noted that each data signal includes a buffer spacing which allows a two bit variation in the tape speed to be accommodated without loss of data information, each word being resynchronized by the first start bit.

Although this invention has been particularly shown and described with reference to a preferred embodiment thereof, it will be understood that various changes in form and detail may be made without departing from the spirit and scope of the invention as set forth in the following claims.

What is claimed is:

1. An apparatus for detecting digital signals played back from a magnetic tape whereon said signal information is recorded in the form of magnetic flux reversals, said flux reversals, during playback, producing a varying signal having a peak amplitude, the improvement comprising:
    means for amplifying said varying signal, said amplifying means having a first input receiving said varying signal and a second input, said second input providing an amplified output inverted with respect to the amplified output created by said first input; and
    means, responsive to a predetermined level of the output signal, for coupling said output signal to said second input and storage means coupled to said second input whereby said output signal follows said varying signal at said first input until said coupling means conducts thereby maintaining said output signal constant and in response to a slope reversal of said varying signal, the input signals to said amplifier become additive producing an abrupt reversal in the polarity of said output voltage from said amplifier.

2. The apparatus of claim 1 wherein said coupling means comprises a pair of diode junctions, said diode junctions being parallel connected and reversed biased so as to couple the output voltage from said amplifier to the second input thereof when the output exceeds a predetermined value and said storage means comprises a capacitor connected between said second amplifier input and the common supply terminal to said amplifier.

3. The apparatus of claim 1 which further comprises a decoder and means for coupling said amplifier to said decoder, means for interrupting the output of said amplifier to said decoder below a fixed level thereby establishing a minimum threshold below which the peak amplitude output of said amplifier is prevented from being coupling to said decoder.

4. The apparatus of claim 3 wherein said threshold interrupting means comprises an amplifier, a negative peak interrupting circuit responsive to the negative peak output of said second amplifier and serving to interrupt the output of said first amplifier when the negative amplifier output fails to exceed a predetermined negative threshold level and a positive peak interrupting circuit responsive to the output of said second amplifier and serving to interrupt the output of said first amplifier when the positive amplifier output fails to exceed a predetermined positive threshold level.

* * * * *